Jan. 7, 1930.　　　A. E. SAWYER　　　1,742,972
GASOLINE TANK FOR MOTOR VEHICLES
Filed Dec. 6, 1928
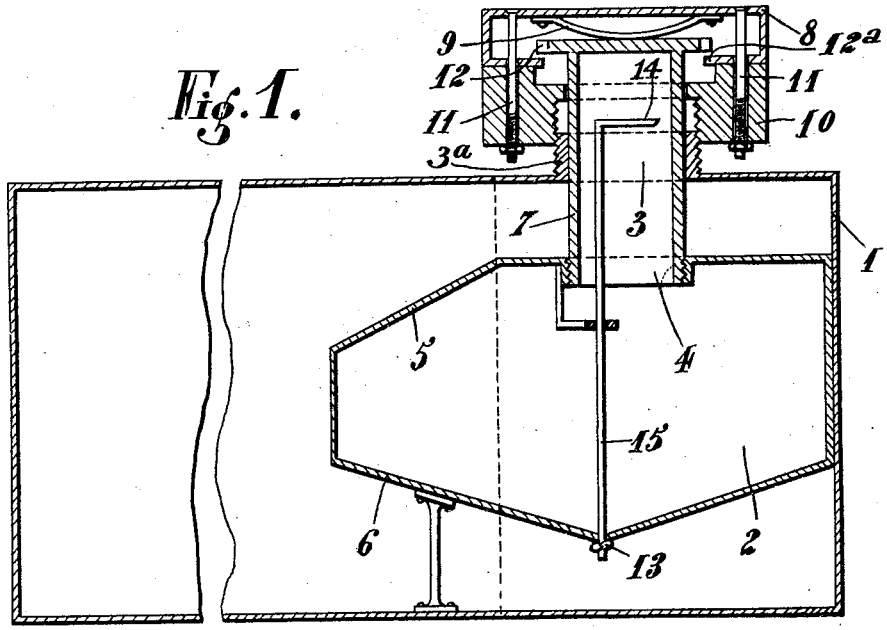
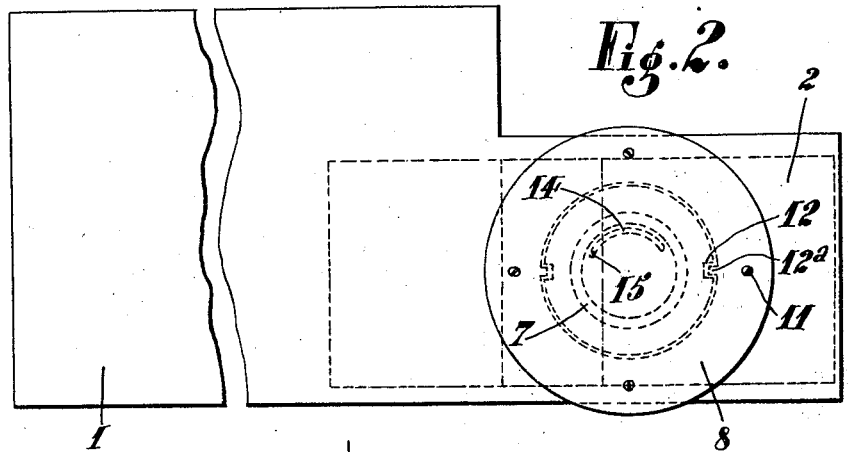
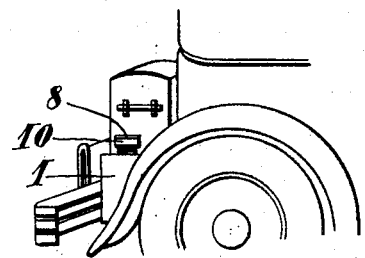
Inventor
Arthur E. Sawyer
by Wilkinson & Giusta
Attorneys.

Patented Jan. 7, 1930

1,742,972

UNITED STATES PATENT OFFICE

ARTHUR ESTCOURT SAWYER, OF AMBOISE, FRANCE

GASOLINE TANK FOR MOTOR VEHICLES

Application filed December 6, 1928. Serial No. 324,173.

The present invention relates to tanks for holding gasoline and more particularly to the tanks of motor vehicles.

One object of my invention is to provide a small emergency tank within the main tank of a motor vehicle adapted to be filled at the same time as said main tank but completely independent thereof so as always to contain a predetermined quantity of gasoline which is only intended to be used in case of emergency when the supply in the main tank has been completely exhausted.

Another object of my invention is to provide a means for closing the filling holes in both the main and emergency tanks said means including a cap member adapted to permit first the emergency tank and then the main tank filling opening to be closed.

Other objects of my invention will become apparent from the following detailed description of the accompanying drawing in which:

Fig. 1 is a sectional elevation illustrating the emergency tank mounted within the main gasoline tank and the means for closing the filling openings in said tanks.

Fig. 2 is a plan view of the device illustrated in Fig. 1.

Fig. 3 illustrates the improved tank according to the invention mounted in position at the rear of a motor vehicle and supporting luggage.

Reference being had to the drawings, the main gasoline tank is comprehensively designated by 1 and the emergency tank by 2. Said emergency tank can be secured within the main tank in any suitable manner. The outer and inner tanks 1 and 2 have openings 3 and 4 respectively which are preferably in register to allow of simultaneous filling of the two tanks. The inner tank 2 has been designed with a sloping side 5 to facilitate filling of the outer tank and with a sloping bottom 6 to permit complete draining of said tank when the gasoline it contains is allowed to flow into the outer tank in a manner presently to be described.

The opening 4 of the inner tank is adapted to be closed by a plug member 7 which is threaded to screw into said opening which is tapped. The opening 3 of the outer tank is formed by a hollow flange 3ª with which said plug 7 makes a sliding fit. At the top of the plug 7 but independent thereof is located a cap member 8 between which and said plug 7 is interposed a spring 9. A ring member 10 is secured to the cap 8 as by screws 11 and said ring member has a depending threaded portion adapted to screw over the flange 3ª which is likewise threaded. The plug 7 is provided with grooves 12 in which lugs 12ª provided on the cap 8 are adapted to engage for a predetermined position of said cap relative to said plug, whereby said plug can be rotated by said cap to screw into the tapped opening 4. A pet-cock 13 normally closes the bottom of the inner tank 2 and prevents the gasoline contained therein from having access to the outer tank 1. Said pet-cock can be opened by a handle 14 on the end of a long rod 15 extending upwardly through the inner and outer tanks.

The device operates as follows:

In order to fill the two tanks, the plug 7 is unscrewed by means of the cap 8 and withdrawn bodily from the tanks, the cap 8 with the ring member 10 being likewise removed. The tanks are then filled up in the usual manner and the plug 7 inserted in the outer tank and screwed into the opening 4 of the inner tank by turning the cap 8. After the plug 7 has been screwed home into the opening 4, the threaded portion of the ring 10 is above the flange 3ª but has not yet come into engagement therewith. A downward force is now exerted on the cap 8 whereby the latter is displaced downwardly relatively to the plug 7 and the ring 10 thus brought into engagement with the flange 3ª. Further rotation of the cap 8 will now cause the ring 10 to screw over the flange 3ª but such rotation of the cap 8 will have no effect on the plug 7 since the downward displacement of said cap has withdrawn its lugs 12 from engagement with the corresponding grooves 12ª of the plug 7.

The opening 3 of the outer tank 1 is consequently closed.

In order to withdraw the cap and plug, the former is first rotated to unscrew the ring member 10 from the flange 3ª and when the ring 10 has become disengaged from the flange 3ª, the spring 9 will force the cap 8 upwardly and the lugs 12 thereon will reenter the grooves 12ª of the plug 7 so that further rotation of the cap 8 will unscrew the plug 7 and both the plug and cap can then be removed.

When the main tank is empty and the car is not near a garage, filling station or other place where gasoline can be obtained, the emergency tank is placed in communication with the main tank by first removing the cap and plug member in the manner previously described and then turning the handle 14 to open the pet-cock 13. It will be observed that said handle 14 is of arcuate form and this design has been adopted so as to avoid any interference with the free flow of the gasoline through the opening 3 when the tanks are being replenished.

In Fig. 3 I have illustrated how the improved tank in accordance with my invention can be used to support a trunk or other suitable article behind a motor car. The reason for providing a protruding reduced portion for the main tank will now be obvious for such protruding portion is not covered by the trunk or other article and is therefore suited for taking the openings through which the gasoline is poured into the tanks. Of course when the main tank is not intended to support any article of luggage, said main tank may be made perfectly rectangular in cross-section and the filling openings introduced where desired.

I claim:

1. In combination with a main gasoline tank, an emergency tank mounted within said gasoline tank and adapted to be filled at the same time as said main tank, and means for closing communication between said emergency tank and said outer tank when filled so that said emergency tank shall remain filled whilst said main tank is emptying.

2. In combination with a gasoline tank for motor vehicles, an emergency tank mounted within said gasoline tank, said inner and outer tanks having openings in register whereby they are adapted to be filled simultaneously, means for closing said inner tank opening and means for closing said outer tank opening after said inner tank opening has been closed.

3. In combination with a gasoline tank for motor vehicles, an emergency tank mounted within said gasoline tank said inner and outer tanks having openings in register whereby they are adapted to be filled simultaneously, a plug member adapted to close said inner tank opening, a cap member adapted to rotate said plug member for closing said inner tank opening and resilient means interposed between said cap and plug members for permitting displacement of said cap relative to said plug member whereby said outer tank opening is closed.

4. In combination with a gasoline tank for motor vehicles, an emergency tank mounted in the said gasoline tank, said inner and outer tanks having openings in register whereby they are adapted to be filled simultaneously, a plug member adapted to close said inner tank opening, a cap member adapted to rotate said plug member for closing said inner tank opening, resilient means interposed between said cap and plug members for permitting displacement of said cap relative to said plug member, and a ring member secured to said cap and adapted to close said outer tank opening after displacement of said cap.

5. In combination with a main gasoline tank for motor vehicles, an emergency tank mounted within said main tank, said inner and outer tanks having openings in register for filling said tanks simultaneously, a screw threaded plug member adapted to engage in the opening of said inner tank, a cap member adapted normally to engage with said plug member for screwing said plug member in said opening of said inner tank by rotation of said cap, resilient means interposed between said cap and plug members for permitting downward movement of said cap relative to said plug member whereby said cap is disengaged from said plug member, and means adapted to be brought into engagement with the opening of said outer tank for closing said opening of said outer tank upon further rotation of said cap.

6. In combination with a main gasoline tank for motor vehicles, an emergency tank mounted within said main tank, said inner and outer tanks having openings in register for simultaneous filling of the two, means for closing communication between said emergency tank and said outer tank, and means for placing said inner tank in communication with said outer tank when the supply of said outer tank is exhausted.

ARTHUR ESTCOURT SAWYER.